(12) United States Patent
Brunson et al.

(10) Patent No.: US 8,510,435 B2
(45) Date of Patent: Aug. 13, 2013

(54) HIGHLY SCALABLE AND DISTRIBUTED CALL/MEDIA MODELING AND CONTROL FRAMEWORK

(75) Inventors: Gordon R. Brunson, Broomfield, CO (US); Joel M. Ezell, Broomfield, CO (US); Harsh V. Mendiratta, Old Bridge, NJ (US); Owen D. Williams, Cardiff (GB)

(73) Assignee: Avaya Inc., Basking Ridge, NJ (US)

( * ) Notice: Subject to any disclaimer, the term of this patent is extended or adjusted under 35 U.S.C. 154(b) by 373 days.

(21) Appl. No.: 12/979,134

(22) Filed: Dec. 27, 2010

(65) Prior Publication Data

US 2012/0163571 A1 Jun. 28, 2012

(51) Int. Cl.
*G06F 15/173* (2006.01)
*G06F 15/16* (2006.01)
*G06F 11/00* (2006.01)
*H04L 12/66* (2006.01)
*H04M 15/00* (2006.01)

(52) U.S. Cl.
USPC ........... 709/224; 709/205; 370/252; 370/352; 379/112.01

(58) Field of Classification Search
None
See application file for complete search history.

(56) References Cited

U.S. PATENT DOCUMENTS

| | | | | |
|---|---|---|---|---|
| 7,958,233 | B2 * | 6/2011 | Fernandez Gutierrez | 709/224 |
| 8,320,363 | B2 * | 11/2012 | Feng et al. | 370/352 |
| 2004/0202295 | A1 * | 10/2004 | Shen et al. | 379/112.01 |
| 2011/0081013 | A1 | 4/2011 | Braudes et al. | |
| 2011/0289203 | A1 * | 11/2011 | Braudes et al. | 709/224 |
| 2011/0289219 | A1 | 11/2011 | Braudes et al. | |

FOREIGN PATENT DOCUMENTS

EP 2247031 11/2010

OTHER PUBLICATIONS

Search Report for United Kingdom Patent Application No. GB1122157.9, dated Apr. 23, 2012 6 pages.

* cited by examiner

*Primary Examiner* — Wen-Tai Lin
(74) *Attorney, Agent, or Firm* — Sheridan Ross P.C.

(57) ABSTRACT

A highly scalable and distributed call/media modeling and control framework is described. In particular, a plurality of anchor point servers are provided which enable one or more applications to exert call and media control over in-progress communication sessions even though the applications were not originally bound to the communication session during its setup.

15 Claims, 9 Drawing Sheets

HIGHLY SCALABLE AND DISTRIBUTED CALL/MEDIA MODELING AND CONTROL FRAMEWORK

FIELD OF THE DISCLOSURE

The present disclosure is generally directed toward communications and more specifically call modeling and control frameworks.

BACKGROUND

Computer telephony integration, also called Computer-Telephone Integration (CTI), is technology that allows interactions on a telephone and a computer to be integrated or coordinated. As contact channels have expanded from voice to include email, web, and fax, the definition of CTI has expanded to include the integration of all customer contact channels (voice, email, web, fax, etc.) with computer systems.

Traditional CTI systems provide a very useful logical call model and control mechanism, but they have several important shortcomings. As one example, existing CTI systems are typically tied to a specific Private Branch eXchange (PBX) and are, therefore, constrained by the domain of users/endpoints that PBX is responsible for. It is also difficult to design a geo-redundant solution due to the tight binding of the CTI system to a PBX. It is also difficult to achieve large scale solutions (e.g., support thousands of communication endpoints/users) with a single PBX. Furthermore, if multiple PBXs are networked together for scale or geographic distribution, it is difficult to construct a complete model of a call spanning multiple PBXs. Still further, very few if any CTI systems provide innate media control mechanisms. Most require an application media endpoint to be explicitly added to a call as a third party. Finally, in terms of high availability, most CTI systems are limited by the availability that is provided by the PBX.

SUMMARY

It is with respect to the above issues and other problems that the embodiments presented herein were contemplated. This disclosure proposes, among other things, mechanisms which allow the creation of a cohesive application enablement session monitoring and/or control system.

In some embodiments, through the power of anchor point servers, calls to and/or from users will be sequenced to one or more anchor point servers that are potentially distributed across geo-regions. Each user will generally have at least a primary anchor point server and secondary anchor point server assigned to them at the Session Initiation Protocol (SIP) sequencing level. When a user makes or receives a call, their anchor point server (whether primary, secondary, tertiary, etc.) is sequenced and an anchor point is established. Once established, the anchor point constructs a logical call model of the participants on that call. In some embodiments, each participant in a call will have an established anchor point, each of which independently models the call for that participant.

Additional details related to anchor point servers, anchor points, construction of logical call models with anchor points, and the like are described in U.S. patent application Ser. Nos. 12/783,224 and 12/783,249, both of which are hereby incorporated herein by reference in their entirety.

In some embodiments, in the event of a conference call, an application will see that the far end entity includes a parameter indicating that it is a conference focus (e.g. the isfocus parameter in SIP). The application can then subscribe to conference state events for that conference focus and thereby construct a complete roster list for the call. Each anchor point will independently subscribe for call state events and maintain its own complete roster list in the call. In the event of a cascaded conference (i.e., dumbbell conference) the anchor point will see that one of the conference participants is itself a focus and will then go subscribe to that focus.

One aspect of the present disclosure provides a unified Communication Session ID (CSID). In some embodiments, the CSID is the same across all anchor point servers for users that are communicating in the same session with each other. For two party calls this is relatively easy to accomplish as it can be a header that is included in the call signaling and which is not modified by intermediate entities (e.g. a P-Charging-Vector ICID for SIP). For conference calls, this becomes a bit more complex. When a two party call is escalated to a conference call, applications will be notified of a new CSID that represents the conference call (e.g., a conference Uniform Resource Identifier (URI) in SIP). However, older CSIDs will also be correlated with the conference call such that applications can continue to issue requests for that CSID.

In some embodiments, a first end of the anchor point server may comprise a call modeling, call control, and media control remote interface. The remote interface may be configured to expose the anchor point server to one or more applications. The remote interface could take many forms including SOAP web services, REST web services, Bayeux, XML over TCP, etc. The application will leverage a client-side library that will handle protocol details as well as handle the mapping of users to anchor point servers. The client-side library will generally have at least two anchor point servers provisioned as its first point of contact into the communication system. When an application issues a request, it most often does so in the context of a user either initiating a call from an endpoint or taking some action on an established SIP dialog.

If a library does not yet have a mapping of the given user to their anchor point server(s), it will try to send the request to a first point of contact (i.e., a first anchor point server) and get a redirect if the first point of contact is not authoritative for the user. That anchor point server will respond with the primary, secondary, tertiary (etc) nodes for that user and the library will store those mappings. In some embodiments, all of this happens transparently to the application.

Once the library has the mapping of a user to their anchor point server it will send any call creating requests to that user's primary anchor point server (if active). If the primary anchor point server is not active, the request will be sent to the secondary, etc.

One special case that must be considered is that where an application is subscribing for communication events for a given user. In that case, two possibilities exist to handle the active-active redundancy.

In a first possibility, the client-side library could broadcast the subscription to all of the user's primary and backup anchor point servers so that they will able to send events to that application and/or client-side library should any SIP messages be routed to them by the infrastructure. In the event of a failure of an anchor point server, the client-side library would automatically re-subscribe when that anchor point server recovers.

In a second possibility, the library could send the subscription only to the primary anchor point server (or highest ranked active server) and that subscription would be part of the minimal shared state between anchor point servers. In this case, no re-subscription by the client-side library would be necessary after an anchor point server recovers.

In a subset of the cases, rather than a request being issued in the context of a user, it will be issued in the context of a CSID (e.g., query for all participants in a call or add a user to a call). In these cases, the request is still directed to an anchor point server that has an anchor point and call model for that CSID. If the request is initially directed to an anchor point server which hasn't modeled that CSID, the initially-contacted anchor point server will query all other anchor point servers to discover which one owns that CSID and will redirect the application to that anchor point server. This prevents the anchor point servers from having to share any per-call data on an ongoing basis and will maintain adequate performance since the use of these sorts of requests will generally be limited. Alternatively, the identity of an active anchor point server on a CSID could be encoded in the CSID itself. The ideal implementation may be to use both of these mechanisms: in the event that the encoded anchor point server drops from a call (e.g. transfer), the broadcast query could be the fallback mechanism.

It should be noted that the solution does not need to depend on any other call feature servers or PBXs.

In some embodiments, the architecture described herein is for an active-active high availability model. In this architecture, the secondary, tertiary, etc. anchor point servers are not idle servers. Rather, they are active for one set of users with unused capacity reserved for failure scenarios for other sets of users.

In some embodiments, a method is provided that generally comprises:

receiving, at an application, a request to utilize one or more features offered by the application with respect to an existing communication session of a user or the next communication session involving the user;

transmitting, by the application to one or more anchor point servers, a request to receive event information about communication sessions from the anchor point server; and establishing a communication link between the application and first anchor point server such that the application can at least one of transmit control signals for the communication session via the communication link and receive event information about communication session via the communication link.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The disclosure will be illustrated below in conjunction with an exemplary communication system. Although well suited for use with, e.g., a system using a server(s) and/or database (s), the disclosure is not limited to use with any particular type of communication system or configuration of system elements. Those skilled in the art will recognize that the disclosed techniques may be used in any communication application in which it is desirable to utilize anchor points.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
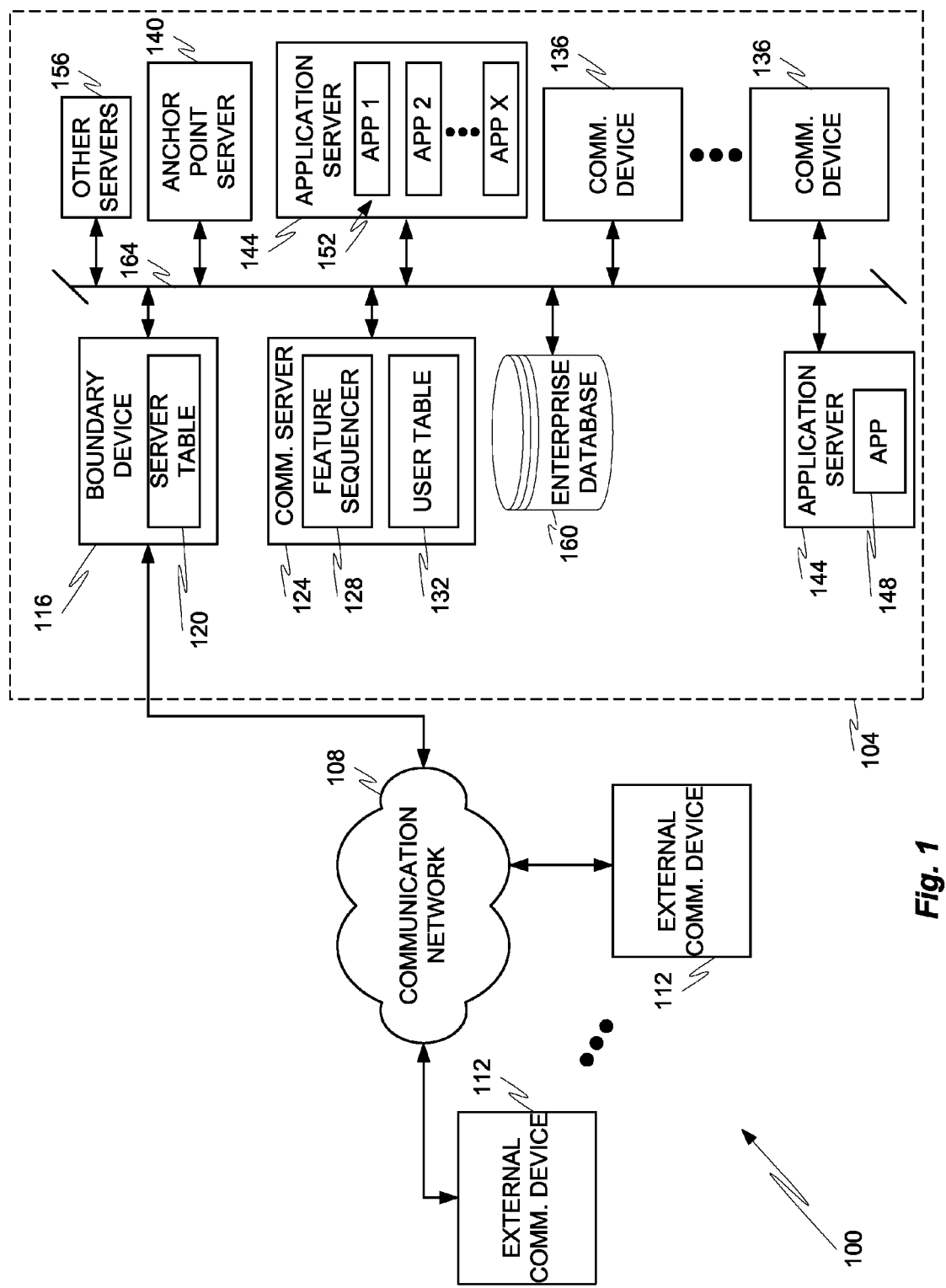
FIG. 1 is a block diagram of a communication system in accordance with embodiments of the present disclosure.

FIG. 1 depicts a communication system 100 according to an embodiment of the present disclosure. The communication system 100 may include an enterprise network 104 that is in communication, via a (typically un-trusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120. The same may be true of the anchor point server 140.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features (i.e., applications 148, 152) should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

In some embodiments, an application 148, 152 is bound to a communications session through an anchor point server 140. Accordingly, the feature sequencer 128 may initially bind an anchor point server 140 into an application sequence during the initial communication session setup. In many cases, the application 148, 152 will subscribe to event notifications for a given user before a call is initiated and even before an anchor point server 140 is sequenced into a call sequence. In other cases, applications 148, 152 may subscribe to event notifications after a call is in progress. In either case, applications 148, 152 may also leverage the anchor point server 140 to exert control over the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In accordance with at least some embodiments of the present disclosure, the anchor point server 140 is provided as a mechanism to create anchor points in a user's communication sequence thereby allowing certain applications 148, 152 to become aware of and control a communication session after the session has been established or allow certain applications 148, 152 to leave a communication session before the session has ended. Particularly, the anchor point server 140 may bind an anchor point or multiple anchor points to a communication session during set-up, but may not necessarily bind any media resource to the communication session until an application identifies a need for that media resource. Accordingly, the anchor point server 140 may incorporate one or more anchor points into the logical communication sequence before and/or after other sequenced applications are bound to the communication session.

Prior to the introduction of anchor points, if an application 148, 152 wanted to have the ability to exert media control on a given communication, it would have to be explicitly provisioned as a sequenced application. However, some applications don't really care about the communication setup phase: they are content to let the communication proceed to the originally addressed party and then exert media and call control mid-session. Provisioning such applications as sequenced applications can often result in an unnecessary waste of media resources and an increase in call establishment latency.

In some embodiments, anchor points are not unique to an application. Instead, they are control points that any application may leverage. They may not even be provisioned but instead are sequenced in automatically by the feature sequencer 128 which would know what anchor points server 140 is authoritative for a given user, as this information may also be found in the user table 132. The anchor point provided by an anchor point server 140 would always be sequenced into at least one point of the application sequence. The location in which the anchor point is placed may vary depending upon the types of features which are desired. Moreover, multiple anchor points may be inserted into a communication session without departing from the scope of the present invention.

The applications that leverage anchor points would be provided with a logical call model similar to that provided by a computer supported telephony application (CSTA), Parlay-X, or any other paradigm used to communicate call state and operations between an application and an anchor point. Such applications that would potentially want to leverage an anchor point would subscribe to call events for endpoints of interest and would be notified when call/connection status changes for a communication session. In some embodiments, the anchor points would not be visible to the applications. Instead, they would invoke media operations on calls or connections within that call and the anchor points would be leveraged transparently.

In most cases, an anchor point would not initially involve a media resource in the media path (e.g., a Real time Transport Protocol (RTP) path). Instead, the anchor point inserts itself as a Back-to-Back User Agent (B2BUA) in the signaling path. Only when an application requests a media action would the anchor point start a Media Server Markup Language (MSML) session with the application server 144 then RE-INVITE to each side to insert the application server 144 into the RTP path. In embodiments where the anchor point is located "next-door" to the endpoint, it is always guaranteed to be able to play or record exclusively to that given endpoint/ user. Since it is possible to add anchor points for each user in an enterprise call, per-party media operations would generally be possible regardless of any intermediate conference foci or applications. Since the media resources required to implement a particular application 148, 152 are not inserted into the path until it is needed, media resources are not wasted and additional RTP delay is avoided.

If each anchor point always brought its own media resources this would potentially result in wasted resources and additional RTP delay. This is where media tokens may be utilized. The first anchor point to insert a first media resource (e.g., a media server) will include a media token in the header of the INVITE or RE-INVITE that is eventually received by a second anchor point involved in the same communication session. This other anchor point will, in most cases, then use the media token information to leverage the media server inserted by the first anchor point, if possible. However, if an intermediate application or conference focus has inserted its own media resources, this media resource reuse by the other anchor point could result in the same problem as before with an application thinking that it is playing or recording one party but really getting multiple parties. To get around this problem the second anchor point will compare the Session Description Protocol (SDP) information in the media token with the SDP information it received in the RE-INVITE. If the SDP attributes match, there is no intermediate media server and the first media resource may be reused. If they do not match, then a new media resource is introduced for the second application. Additional descriptions of media tokens and the advantages of using the same are provided in U.S. patent application Ser. No. 12/574,604 to Braudes et al. filed Oct. 6, 2009, the entire contents of which are hereby incorporated herein by reference.

One feature that can be supported is that an application can tell the anchor point that it should always include a particular media resource for all calls for a given user (i.e., based on user preferences in the user table 132). An example would be if the application knows that it always wants to record all calls for a given user. In that case, the application would indicate this to the anchor point (perhaps with a parameter when establishing a monitor for that user) and, therefore, the potential for "clipping", which would be otherwise introduced by inserting a new media resource mid-call, would be eliminated.

However, it is often the case that applications 148, 152 won't specify a media resource to be used, but instead will generically ask for a media resource to be included in a communication session. Upon receiving such a request from an application 148, 152, an anchor point server 140 will select an appropriate resource for the application 148, 152 and invoke the selected resource.

In some embodiments, these anchor points could also potentially be used for call control purposes, being a B2BUA. They would enable transfer, conference, drop operations on behalf of another controlling entity.

The other servers 156 may comprise email servers, voicemail servers, calendaring servers, conferencing servers, and other types of servers known to provide particular services to client devices. In some embodiments, the other servers 156 may also be considered application servers 144, which provide one or more applications for use in a communication session.

The internal communication devices 136 can be similar or identical to the external communication devices 112, except they are provisioned, and often owned, by the enterprise. Exemplary types of communication devices 112 include, without limitation, any capable phone, hardphone, softphone and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

Figure 2:
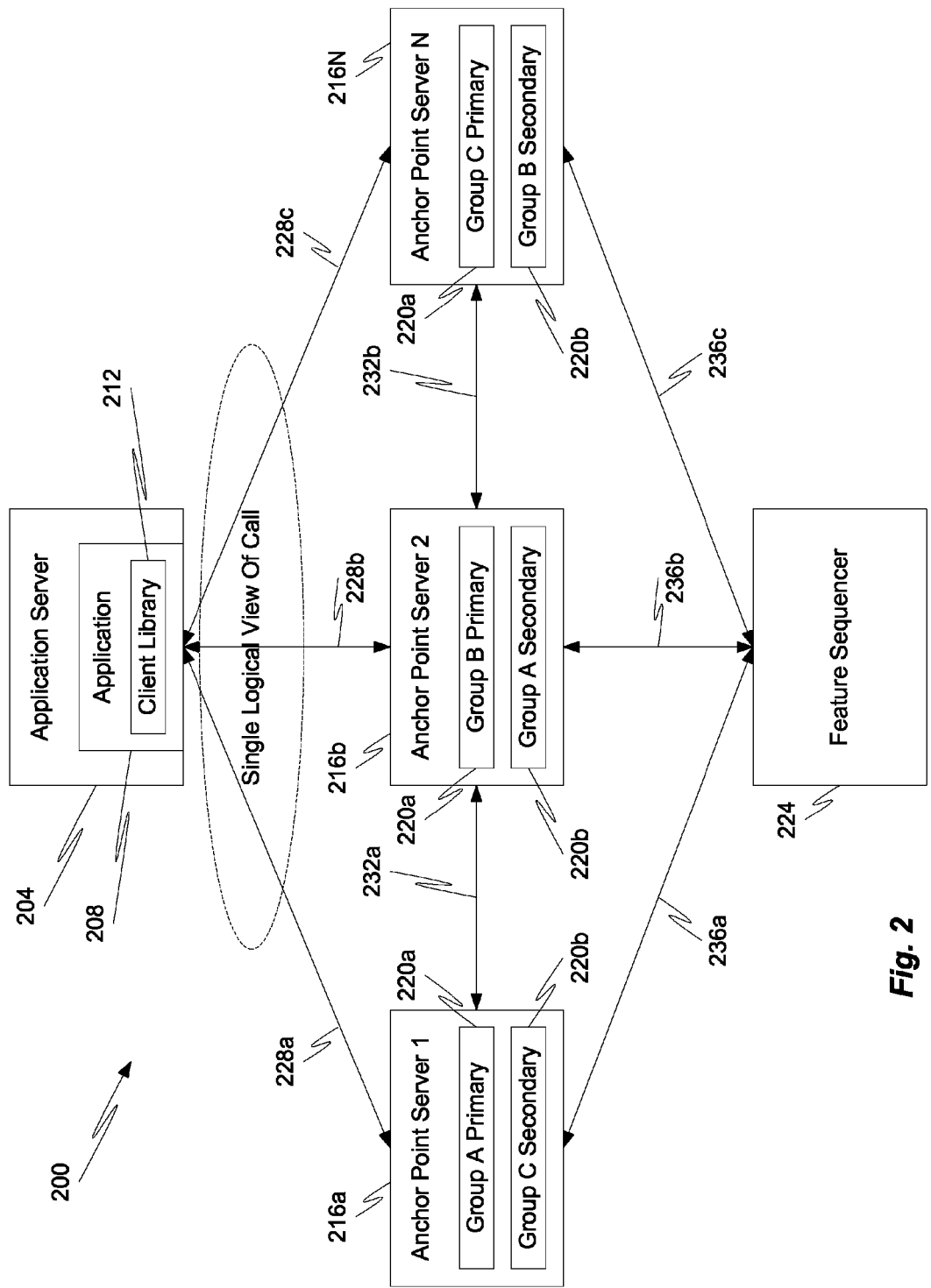
FIG. 2 is a block diagram depicting a first configuration of communication system elements in accordance with embodiments of the present disclosure.

With reference now to FIG. 2, a configuration of a communication system 200 in which an application 208 leverages an anchor point server 216 to participate in a communication session will be described in accordance with at least some embodiments of the present disclosure. The communication system 200 configuration represents a redundant or highly-available set of anchor point servers 216a-N which provide one or more anchor points in a communication session for an application 208. The application server 204 may be similar or identical to the application server 144. The anchor point servers 216a-N may be similar or identical to the anchor point server 140. In some embodiments, the anchor point servers 216a-N may be co-located in a common facility or may be physically separated from one another to provide geo-redundancy. For example, the anchor point servers 216a-N may be separated by one or more geographical boundaries or borders such as state lines, country lines, oceans, etc. The feature sequencer 224 may be similar or identical to the feature sequencer 128 provided on the communication server 124 or it may be a stand-alone component. In some instances, the feature sequencer 224 may be geo-redundant, meaning that multiple versions of the feature sequencer 224 are provided at separate physical locations, possibly at different LANs in a larger WAN.

In some embodiments, the application server 204 provides one or several applications 208 as well as one or more client libraries 212. The client library 212 is a set of instructions that are application-independent, meaning that the client library 212 can serve a plurality of applications 208. In some embodiments, the client library 212 is provided to manage mappings of users to anchor point servers so that any application, including application 208, can leverage the client library 212 to attach to an anchor point established by an anchor point server. This allows the application 208 to be unaware of how many anchor point servers 140 are actually in existence as well as any mappings associated with such anchor point servers 140. Rather, this task is delegated to the client library 212 and made available to the application 208 on a per-request basis.

More specifically, the client library 212 may contain a listing of users, user IDs, Addresses of Record (AoRs), user aliases, etc. that are mapped to one or more anchor point servers 216a-N. In some embodiments, the client library 212 also includes instructions for keeping track of which server is primary/secondary/tertiary for particular users, but it doesn't have to indicate any of that information to any other component. Rather, it directly uses that information to respond to requests received from applications. In some embodiments, the client library 212 maintains information that indicates which of the anchor point servers 216a-N is a primary anchor point server for a user (i.e., anchor point server to be used as a default for a user if available), which of the anchor point servers 216a-N is a secondary anchor point server for a user (i.e., anchor point server to be used if the primary anchor point server is unavailable), which of the anchor point servers 216a-N is a tertiary anchor point server for a user (i.e., anchor point server to be used if the primary and second anchor point servers are unavailable), and so on.

Likewise, each anchor point server 216a-N may maintain lists of its primary users 220a and lists of secondary users 220b. The lists 220a, 220b may identify which users the anchor point server 216 supports. If a particular anchor point server 216 is not authoritative for a particular user or group of users, then the lists 220a, 220b may also identify which anchor point servers 216 are authoritative for a particular user or group of users. Thus, the client library 212 can, on behalf of an application 208, query any one of the anchor point servers 216 and determine which anchor point server 216 is authoritative for a specific user. Once the client library 212 obtains such information from the anchor point server 216, the client library 212 can update its internal records of user-to-anchor point server mapping and make such information available to applications on an as-needed basis.

As discussed above, the feature sequencer 224 may initially sequence one or more anchor point servers 216a-N into an application sequence during call initialization. In some embodiments, an application 208 may be configured to monitor all communication sessions for a given user right from the start of the communication session and it may utilize an anchor point server 216a-N to accomplish such monitoring.

In other embodiments, at some point after the communication session has begun, a user may invoke the application 208 to begin monitoring the communication session. Upon being invoked, the application 208 may first refer to the client library 212 to determine if an authoritative anchor point server 216a-N is already known for that user. If so, the client library 212 returns the mapping information to the application 208 or routes the application's 208 request to the appropriate anchor point server 216 on behalf of the application such that the application 208 is enabled to issue a call monitoring/control request to the identified anchor point server 216. If, however, the client library 212 does not have an anchor point server entry for the user, then the client library 212 sends a request to either a default anchor point server 216 or randomly selected anchor point server 216. If that server happens to be authoritative for that user, then the anchor point server 216 will process the request in the normal fashion thereby binding the application 208 to a particular communication session. If the queried server is not authoritative for that user, then the server 216 may simply refer to its internal lists 220a, 220b to identify which of the anchor point servers 216a-N is authoritative for the user and provide that information back to the application 208.

The provision of multiple anchor point servers 216a-N enables a highly-available configuration of anchor points. In some embodiments, the anchor point servers 216a-N may be configured in an active-passive configuration where one anchor point server 216 operates as a primary anchor point server for a user whereas another anchor point server 216 operates as a secondary anchor point server. In the active-passive configuration, the primary anchor point server 216 may be invoked by the feature sequencer, receive the media stream of the communication session, and perform all functions required to create an anchor point and enable the application 208 to leverage the anchor point. The secondary anchor point server 216, on the other hand, may remain idle until it is detected that the primary anchor point server 216 is no longer capable of providing the necessary functions (i.e., the primary anchor point server 216 has failed). If such an event is detected, then failover procedures may be followed whereby some per-call state information is shared between anchor point servers 216 of an inter-anchor point communication link 232a, 232b. The call state information enables the secondary anchor point server 216 to continue offering the application 208 a means for connecting to the communication session, receiving call-based event notifications, and exerting control over media of the communication session.

As an alternative to the active-passive configuration, redundant anchor point servers 216 may be set up as active-active. This configuration means that multiple anchor point servers 216 may be active for a single user during a communication session. Only one of the anchor point servers 216 may be used by the application 208 and the other anchor point server 216 may simply store the call event information without further processing. The active-active configuration enables a quicker and smoother transition during failover. The utilization of an active-active configuration also avoids the need to tear down a communication session during failover and failback. If call preservation during failover is a goal, then call state sharing may be required since only the primary anchor point server would be initially sequenced.

In some embodiments, the client library 212 could issue subscriptions for a given user to each of the anchor point servers 216 that might become authoritative for that given user. In that case, the anchor point servers 216 wouldn't have to share state with each other with respect to application subscriptions. However, other call state may have to be shared.

In some embodiments, the anchor point servers 216a-N are configured to always and only see two legs of a communication session. The two primary cases are a two-party conversation or a conference call where the second leg seen by an anchor point server 216 is to a conference focus. What enables the application 208 to see a centralized communication session (similar to a PBX-based communication session) is the anchor point server 216 composes a logical call model. It also allows the anchor point servers 216 to hide from the applications 208 whether or not they are involved in a two-party call or a conference call.

As can be seen in FIG. 2, a first communication link 228a, 228b, 228N may be established between the application server 204 and anchor point server 216a, 216b, 216N, respectively. The first communication link 228a, 228b, 228N may be used to exchange call event information and binding requests for specific groups of users. In some embodiments, each anchor point server 216 may be provided with a remote interface that facilitates the establishment and maintenance of the first communication link 228a, 228b, 228N. Remote interface may comprise a call modeling, call control, and media control remote interface that exposes the anchor point server 216 to the application server 204. This remote interface can take many forms including, without limitation, SOAP web services, REST web services, Bayeux, XML over TCP, and so on.

A second communication link 236a, 236b, 236N may also be established between the feature sequencer 224 and anchor point server 216a, 216b, 216N, respectively. The second communication link 236a, 236b, 236N may be used to carry session signaling between on behalf of the application 208 to/from the communication session. The second communication link 236a, 236b, 236N provides the application 208 with a mechanism for receiving call state information and exerting control over media resources of the communication session.

Figure 3:
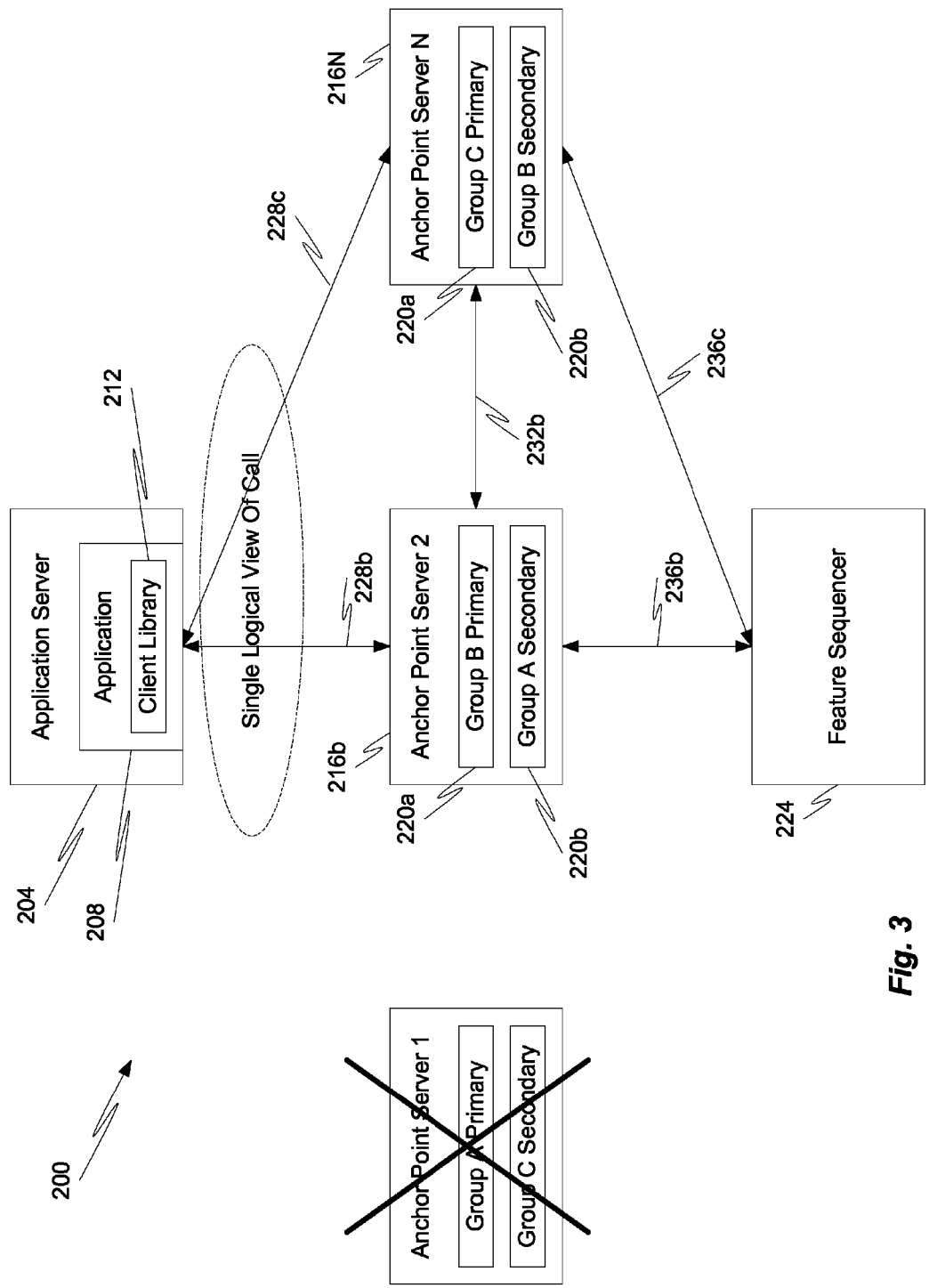
FIG. 3 is a block diagram depicting a second configuration of communication system elements in accordance with embodiments of the present disclosure.

As can be seen in FIG. 3, a situation may occur where one or more of the anchor point servers 216 become either temporarily or permanently unavailable. This situation is usually referred to as a server failure and may result in the need to perform failover procedures for users that were leveraging the now failed anchor point server 216. As discussed above, the steps taken during failover may depend upon whether an active-passive or active-active model is being followed by the anchor point servers 216a-N. In an active-passive model, some call-state information may need to be provided to the backup anchor point server 216 before the application 208 is enabled to utilize an anchor point provided by the anchor point server 216. In an active-active model, a user's secondary anchor point server 216 is not idle. Rather, it is active for all users in its secondary list of users 220b with unused capacity reserved for failure scenarios.

In the event of a failure, the possibility exists that there will be a transitory state where multiple anchor point servers 216a-N have active calls for a given user. In this case, any mid-call requests (e.g., hold call, retrieve call, etc.) should be directed by the client library 212 to the anchor point server 216 that owns the call (i.e., is authoritative for the user initiating the request). This can be accomplished by encoding an ID of the anchor point server 216 has handled the call up until failure was detected into a connection ID that is used by the application 208 to perform the mid-call request. In some embodiments, the connection ID may comprise a combination of the CSID for a particular call, a user ID (identifying the requesting user), and an identification of the anchor point server 216 which is requested to perform the action on behalf of the user.

Figure 4:
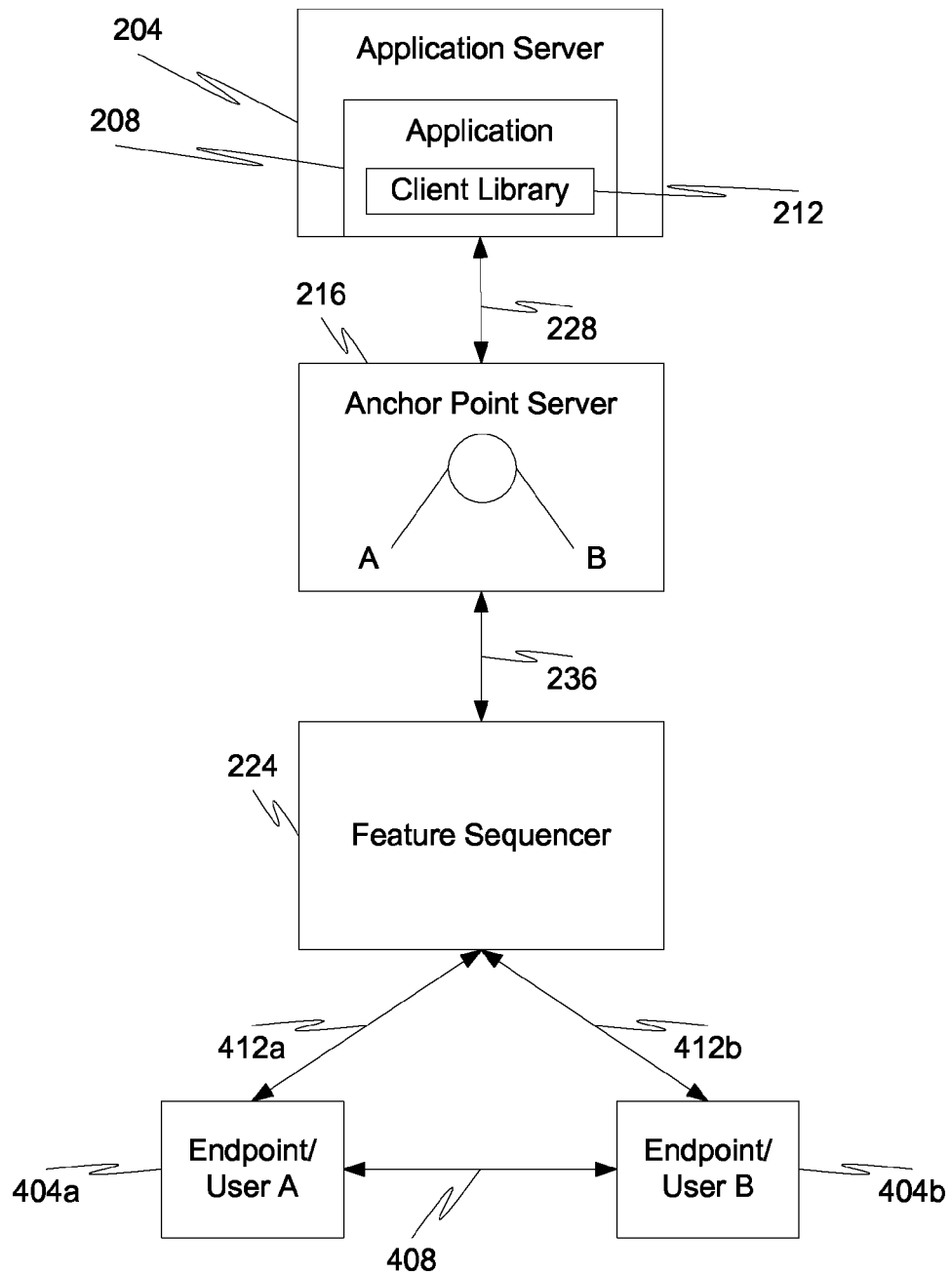
FIG. 4 is a block diagram depicting a configuration of communication system elements to support a communication session between two users that share an anchor point server in accordance with embodiments of the present disclosure.

With reference now to FIG. 4, a configuration of communication system elements to support a communication session between two users that share an anchor point server is shown in accordance with embodiments of the present disclosure. It may be the case that two users involved in a communication session share the same anchor point server 216 as their primary anchor point server 216. In some embodiments, an anchor point server 216 will model a call twice, once for each user. In such a configuration, a single first communication link 228 is established between the application server 204 and anchor point server 216 and a single second communication link 236 is established between the feature sequencer 224 and anchor point server 216. Third communication links 412a, 412b may be established between the feature sequencer 224 and each endpoint 404a, 404b involved in the communication session. The third communication links 412a, 412b may carry session signaling for a particular user or endpoint. Accordingly, session signaling for user A may be carried by communication link 412a whereas session signaling for user B may be carried by communication link 412b. An endpoint-to-endpoint link 408 may also be established between the endpoints 404a, 404b to carry media between the endpoints 404a, 404b, thereby facilitating the communication session between the endpoints 404a, 404b. In some embodiments, the endpoint-to-endpoint link 408 is an RTP or SRTP stream.

Figure 5:
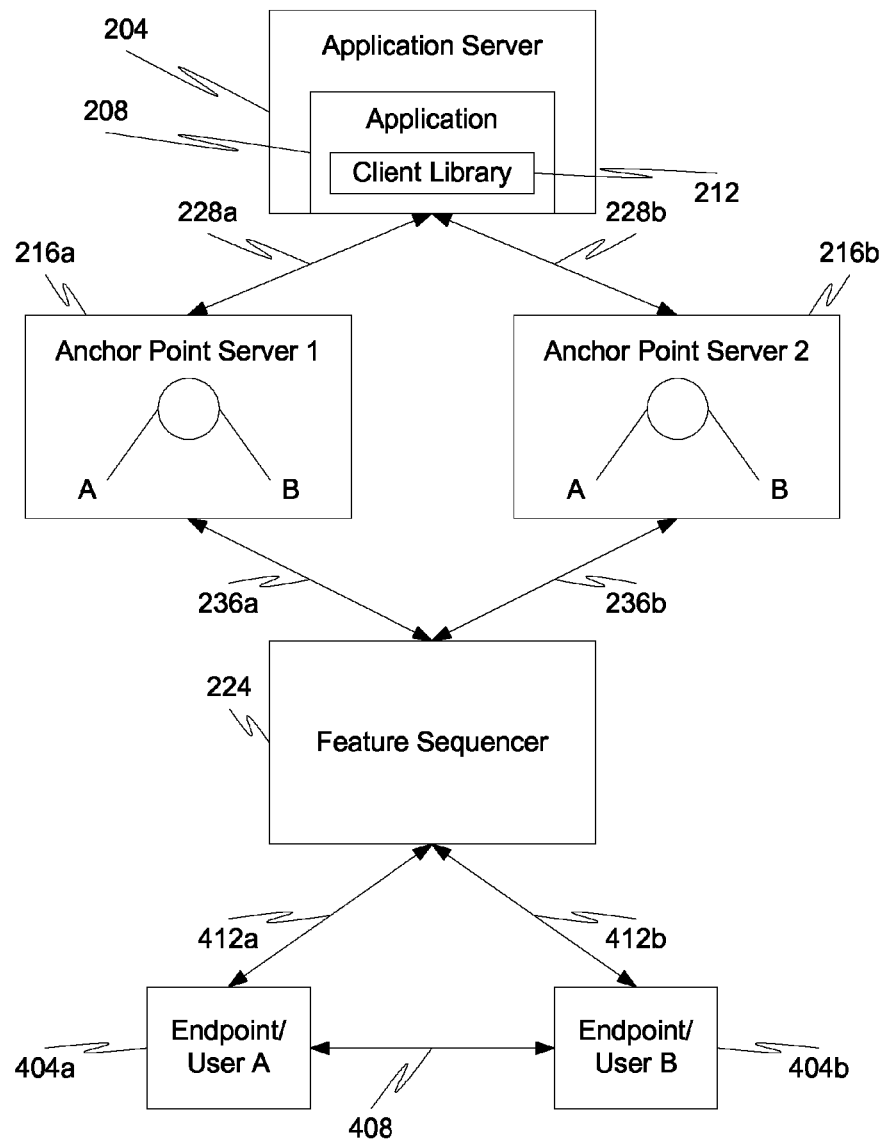
FIG. 5 is a block diagram depicting a configuration of communication system elements to support a communication session between two users that do not share an anchor point server in accordance with embodiments of the present disclosure.

With reference now to FIG. 5, an alternative configuration of communication system elements to support a communication session between two users that do not share an anchor point server is shown in accordance with embodiments of the present disclosure. Here, a first anchor point server 216a is authoritative for user A and a second anchor point server 216b is authoritative for user B. There is no requirement to share per-call state data between the anchor point servers 216a, 216b. Each anchor point server 216a, 216b enables the application 208 to provide the desired features for both users, but still enables the application to maintain a single logical view of the call.

As compared to the configuration of FIG. 4, there are multiple first communication links 228a, 228b and second communication links 236a, 236b. The communication link 228a between the application server 204 and first anchor point server 216a carries event and request data signals for user A. Likewise, the communication link 228b between the application server 204 and the second anchor point server 216b carries event and request data signals for user B. User A's session signaling is carried over communication links 236a and 412a. User B's session signaling is carried over communication links 236b and 412b.

Figure 6:
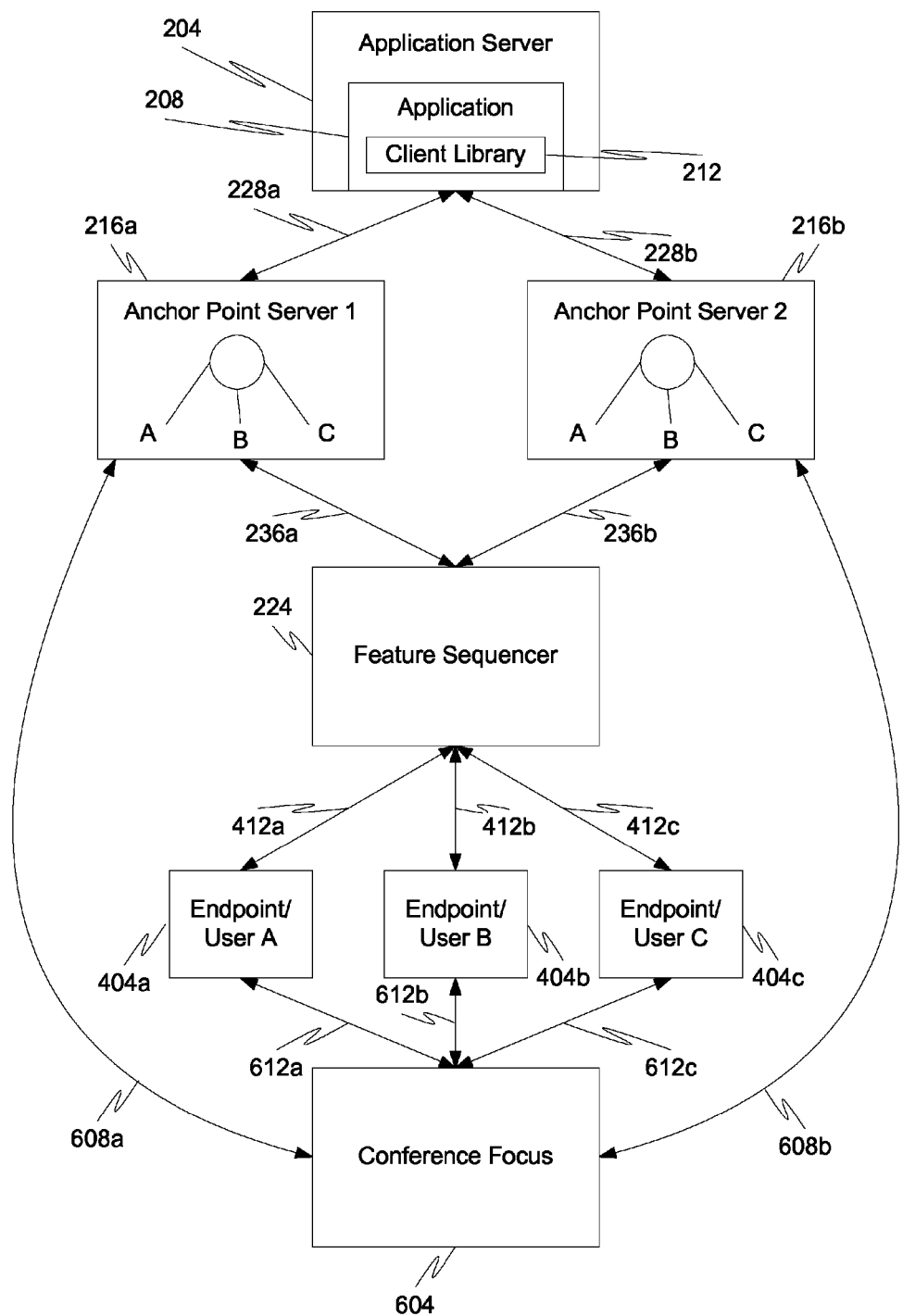
FIG. 6 is a block diagram depicting a configuration of communication system elements to support a conference communication session between three or more users in accordance with embodiments of the present disclosure.

With reference now to FIG. 6, a configuration of communication system elements to support a conference communication session between three or more users is depicted in accordance with embodiments of the present disclosure. As with the configuration of FIG. 5, there is no requirement that per-call state information is shared between the anchor point servers 216a and 216b. Also, the configuration depicted in FIG. 6 shows that one anchor point server (e.g., second anchor point server 216b) is authoritative for two users involved in the conference (e.g., user B and user C). It may be the case that all of the users share the same anchor point server 216 as their primary server or it may be the case that each user has a different anchor point server 216 as their authoritative anchor point server. The example depicted in FIG. 6 is provided for explanation purposes only and is not intended to limit the scope of the present disclosure.

In a conference communication session, a conference focus 604 may be introduced as a point where media is shared, mixed, and re-distributed among the endpoints 404a, 404b, 404c. In some embodiments, the conference focus 604 may comprise a conference bridge or conference mixer residing on a conferencing server. Alternatively, the conference focus 604 may reside at one of the endpoints 404a, 404b, 404c.

In this embodiment, media is exchanged between the endpoints 404a, 404b, 404c via the conference focus 604 and the media signals are carried over communication links 612a, 612b, 612c. In some embodiments, the communication links 612a, 612b, 612c may correspond to RTP or SRTP streams that have been established using SIP or some other similar protocol.

Additional communication links 608a and 608b may be established between the conference focus 604 and anchor point servers 216a and 216b, respectively. The communication links 608a, 608b may be used by the anchor point servers 216a, 216b to subscribe to conference state events and receive information about such events directly from the conference focus 604 rather than through the endpoints 404a, 404b, 404c and feature sequencer 224. This enables each anchor point server 216a, 216b to maintain an awareness of activity at the conference focus. Thus, if another user joins the conference via an endpoint already involved in the conference, the conference focus 604 will become aware of the addition of the new user and will send a state event to the anchor point servers 216a, 216b indicating the same.

In some embodiments, the anchor point servers 216a, 216b uses the conference events to compose a complete roster list even though the anchor points for the individual users are spread across N servers. There could also be N conference foci in a highly scalable, highly distributed network and the logical call model abstracts the application from that information.

Figure 7:
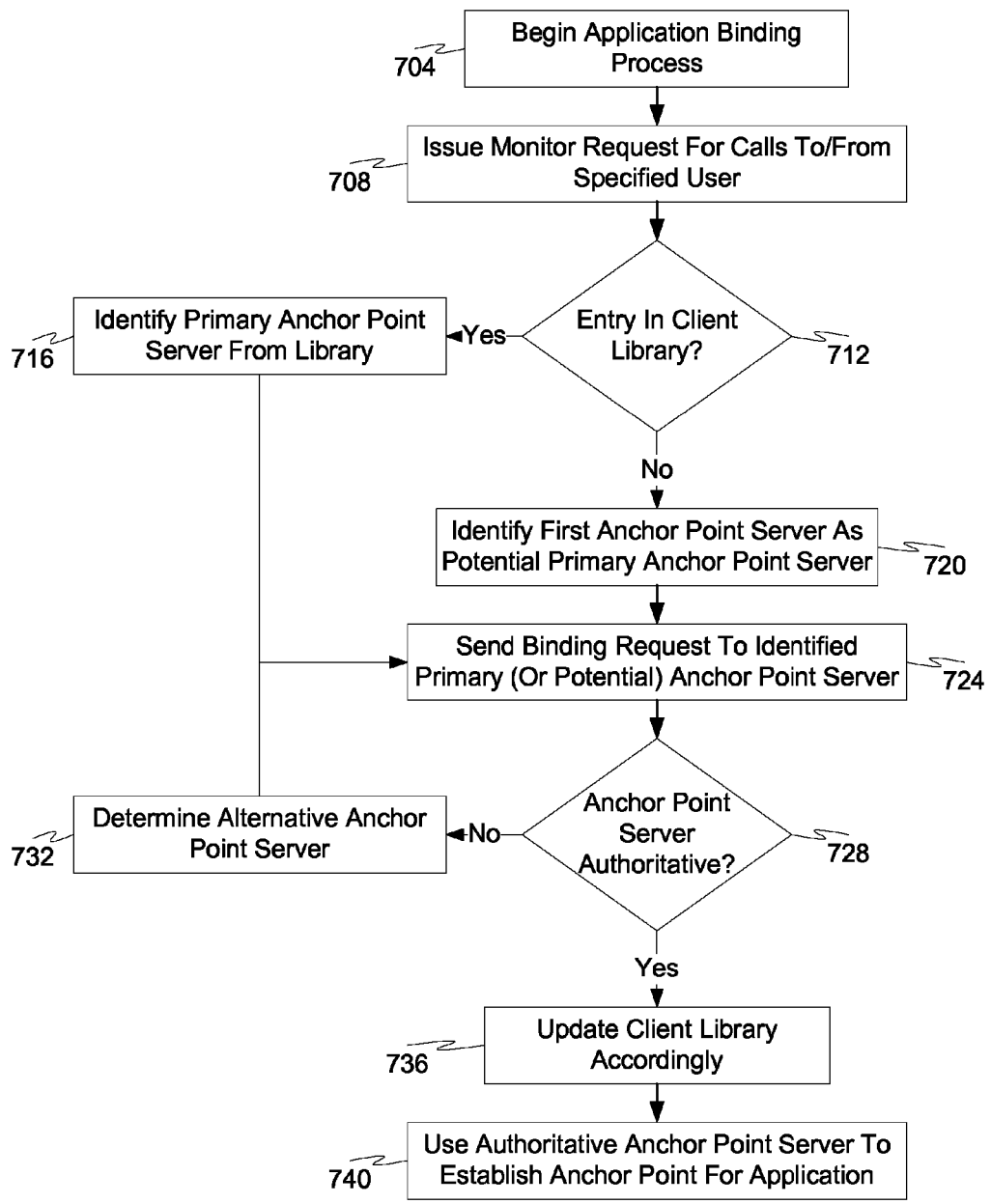
FIG. 7 is a flow diagram depicting an application-to-anchor point server binding process in accordance with embodiments of the present disclosure.

With reference now to FIG. 7, an application binding process will be described in accordance with at least some embodiments of the present disclosure. The method begins when a feature sequencer 224 or user invokes an application 208 to begin the application binding process whereby the application attempts to bind itself to a communication session (step 704). In some embodiments, the communication session may be an in-progress communication session whereas in other embodiments the application may be bound to a communication session via an anchor point server 216 when the anchor point server 216 is initially sequenced into the communication session. Upon receiving the instructions to start the binding process, the application 208 issues a monitor request for calls to/from a particular user (step 708). The request is received at a client library 212 and the client library 212 refers to its locally-maintained data structures to determine if it already knows the authoritative (i.e., primary) anchor point server 216 for the particular user (step 712).

If an entry is found in the client library 212 for the particular user, then the client library 212 may identify the anchor point server 216 which is mapped to the particular user in its data structures (step 716) and issue a request to the anchor point server 216 identified as the primary anchor point server 216 on behalf of the application 208 (step 724). Thus, a client library 212 is enabled to create an application-to-anchor point binding on behalf of one or many applications.

In some embodiments where an active-active configuration of anchor point servers 216 is used, the client library 212 may issue multiple requests to multiple anchor point servers 216. The issuance of multiple requests may be done by broadcasting the request to all known anchor point servers 216 or by transmitting the request to selected ones of the anchor point servers 216. It should be noted, however, that broadcasting of multiple requests can be done in situations where the request is a query or a subscription and can generally not be done if the request is for call control.

Alternatively, if there is no entry in the client library 212, then the client library 212 selects an anchor point server 216 either by default selection rules or by random and acts as if that selected anchor point server 216 is actually the primary anchor point server 216 for the requesting user (step 720). The selection of a single anchor point server 216 may occur regardless of whether an active-active or active-passive mode of anchor point server operation is utilized.

Once an anchor point server 216 has been identified by the application 208, either via the client library 212 or via a selection algorithm, the method continues with the client library 212 issuing a request on behalf of the application 208 to the selected anchor point server 216 (step 724). The request(s) issued to the anchor point server(s) 216 contains instructions for the anchor point server 216 to utilize an anchor point established or soon to be established in a particular communication session (in which the particular user may or may not already be a participant) to retrieve call event, control, and other data and provide such data back to the application 208. The anchor point will also be used by the application 208 to exert call control and media control over the communication session via control signals transmitted to the anchor point server 216 that has established the anchor point. The request may also contain one or more of a user ID, an AoR, an alias, a CSID, or any other identification of a user or communication session that enables the anchor point server 216 to determine if it is configured and/or allowed to support the request issued by the application 208.

Upon receiving the request from the application 208, the anchor point server 216 refers to its internally-maintained lists 220a, 220b to determine if it is actually the anchor point server 216 that is authoritative for the requesting user (step 728). This step may be performed by each of the anchor point servers 216 that receives the request from the application 208 (i.e., if multiple requests were transmitted or broadcast to multiple anchor point servers 216). In this step, the anchor point server 216 will search for either a user identifier in its internally-maintained list 220a, 220b or it will search for a CSID contained in the request. If the request transmitted by the application 208 contained a CSID, then the anchor point server 216 will determine if it currently has an anchor point established in a communication session that has been assigned the CSID contained in the request.

If the analysis of the request indicates that the anchor point server 216 is not authoritative for the requesting user (or there is no CSID match), then the anchor point server 216 may either attempt to identify an alternative anchor point server 216 as the appropriate server to handle the request and may transmit such information back to the requesting application 208 (step 732). Alternatively, if the anchor point server 216 does not know the identity of the appropriate anchor point server 216 to handle the request, the anchor point server 216 may respond to the application 208 that it is not capable of supporting the request or it may not respond at all. This may initiate a process where the application 208 attempts to identify an alternative anchor point server 216 and issues a request to that anchor point server 216 until the authoritative anchor point server 216 for the requesting user is found.

If the anchor point server 216 analyzes the request and determines that it is authoritative for the requesting user (either as a primary or secondary anchor point server), then the anchor point server 216 may send a response to the application 208 indicating the same. Upon receiving the affirmative response from the anchor point server 216, the client library 212 may update its locally-maintained data structures by mapping either a user ID, the CSID, or some other identifier to an identifier of the anchor point server 216 that has affirmatively responded to the request (step 736).

Once the client library 212 has been updated with the user-to-anchor point server mapping information, the method continues with the application 208 using the anchor point established by the authoritative anchor point server 216 to exert control over the call and receive call event and status information (step 740).

Although FIG. 7 depicts the application 208 as issuing a monitoring request before identifying communication sessions, embodiments of the present disclosure also contemplate situations where the application 208 may first issue a query for all existing sessions for a particular user. The query may be transmitted to one or more anchor point servers 216 via the client library 212. If the application 208 learns of an in-progress communication session for the particular user, then the application 208 may attempt to bind itself to that communication session (if it isn't already bound to that communication session) and then attempt to take an action on that in-progress communication session.

Figure 8:
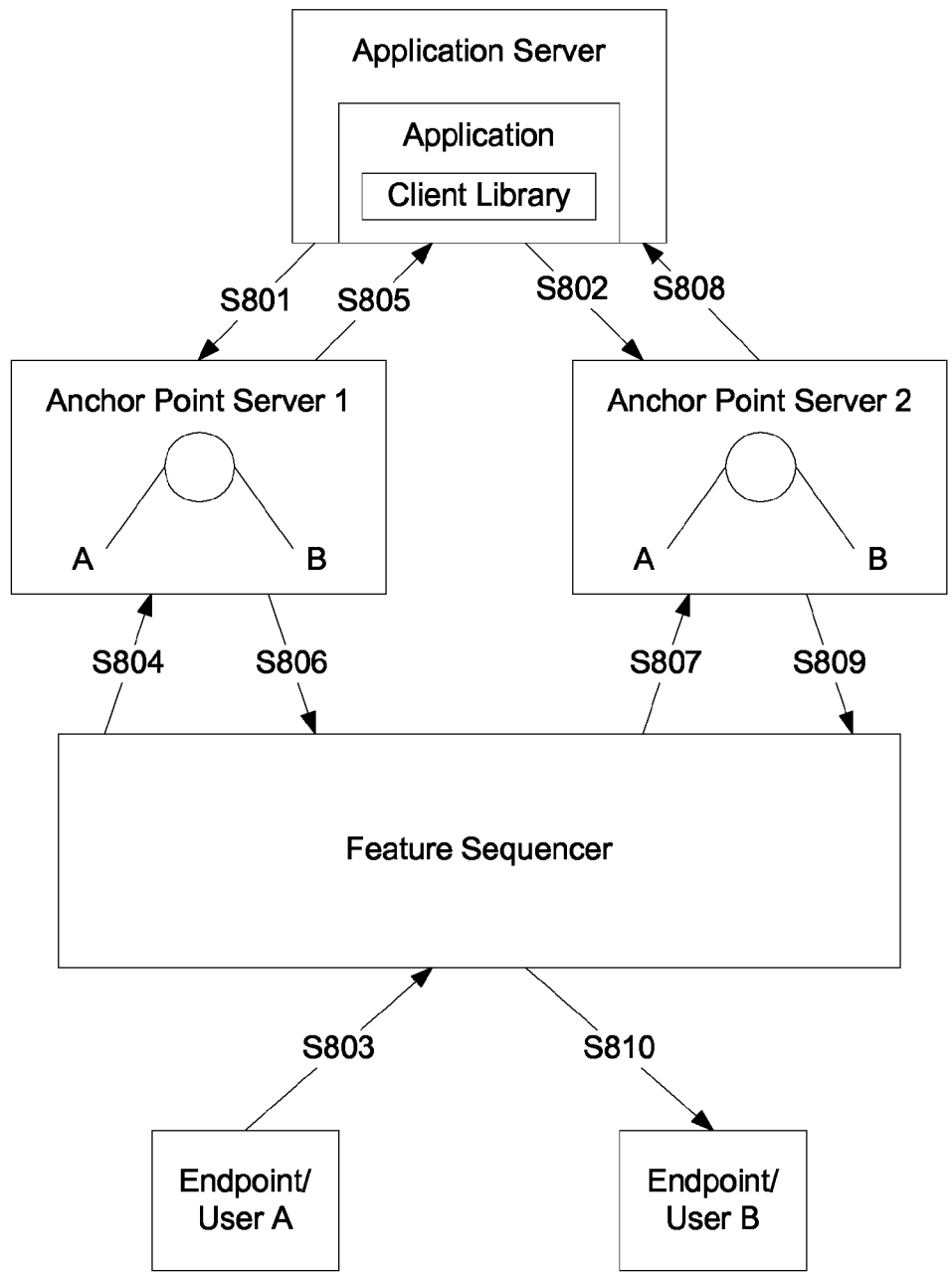
FIG. 8 is a call-signaling diagram depicting an application monitoring user call activity via an anchor point in accordance with embodiments of the present disclosure.

FIG. 8 depicts a signaling sequence used by the application 208 to establish, before or after a communication session begins, a call-monitoring function for a particular user in accordance with at least some embodiments of the present disclosure. As with other embodiments described herein, the application 208 has access to a client library 212 that maintains one or more data structures for mapping users to anchor point servers 216. In the embodiment depicted in FIG. 8, User A is mapped to the first anchor point server 216a (i.e., the first anchor point server 216a is authoritative for User A) and User B is mapped to the second anchor point server 216b (i.e., the second anchor point server 216b is authoritative for User B).

The sequence begins when the application 208 determines that it wants to monitor all communication sessions (i.e., those not yet established and those already in progress) for one or more users. In the example depicted in FIG. 8, the application 208 determines that it wants to monitor communication sessions for Users A and B. As can be appreciated, however, the application 208 may only be interested in monitoring communication sessions for User A or User B, but not both. In such a situation, the application 208 will issue a single atomic monitor request to one of anchor point servers 216a, 216b rather than issuing two unrelated requests to both anchor point servers 216a, 216b as will be described in further detail herein.

This determination may be made in response to the application 208 receiving a user input requesting to monitor all calls for Users A and B or it may be made automatically in response to a pre-provisioned rule that dictates the application 208 is to be invoked for communication sessions in which Users A and B are involved. In some embodiments, this determination is made once when the application 208 starts up (i.e., is powered up). Upon making this determination, the application 208 issues a request to the client library 212 which identifies the first anchor point server 216a as authoritative for User A and the second anchor point server 216b as authoritative for User B and forwards the requests to the first and second anchor point servers 216a, 216b for User A and User B, respectively (S801 and S802). The identification of authoritative anchor point servers for Users A and B may be achieved by using some or all of the method described in connection with FIG. 7.

After the request is received at the authoritative anchor point servers 216, the anchor point servers 216 will wait until an INVITE (or similar call-setup request is received from either User A or User B). In the example of FIG. 8, User A sends an INVITE to User B in an attempt to establish a communication session (S803). The INVITE is initially received at the feature sequencer 224 and analyzed. The feature sequencer 224 checks to see which applications have requested notifications for User A. In this example, the feature sequencer 224 determines that application 208 has issued such a monitoring request for User A and sends a notification to application 208 via the first anchor point server 216a (S804). The first anchor point server 216a sends a notification to application 208 that User A is calling User B (S805). After the application 208 has received the notification for User A, then the application 208 is ready to take some action on the communication session for User A. Since a notification has not yet been received for User B, the application 208 will not yet be ready to take an action on the communication session for User B.

Thereafter, the first anchor point server 216a sends the INVITE back to the feature sequencer 224 (S806). Upon re-receiving the INVITE, the feature sequencer 224 checks its internally-maintained data structures to determine which anchor point server is authoritative for User B and then forwards the INVITE to the second anchor point server 216b (S807). The second anchor point server 216b checks to see which applications have requested notifications for User B and finds an entry indicating that application 208 has issued such a request for User B. Upon making this determination, the second anchor point server 216b sends a notification to the application 208 (S808).

Thereafter, the second anchor point server 216b sends the INVITE back to the feature sequencer 224 (S809), which subsequently sends the INVITE message to User B's endpoint (S810). Subsequent SIP messages used to finalize establishment of the communication session may then be exchanged between endpoints and anchor point servers 216a, 216b in a normal Back-to-Back UA (B2BUA) fashion until a communication session is established between the endpoints.

Figure 9:
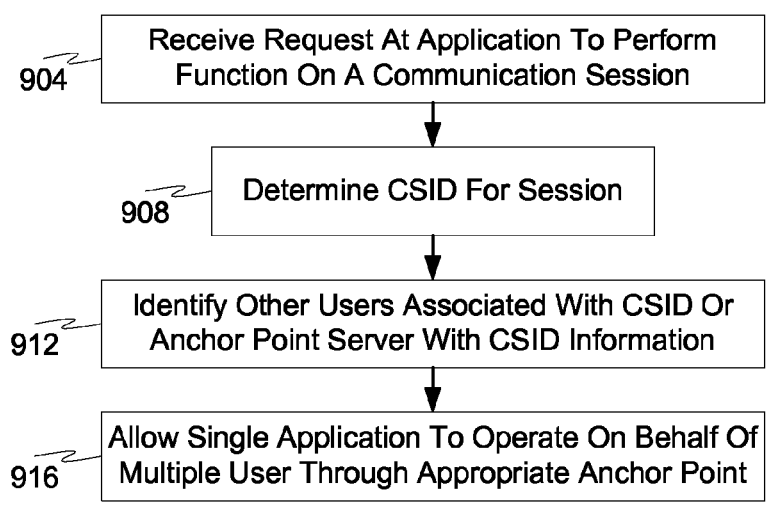
FIG. 9 is a flow diagram depicting a process of utilizing a CSID to enable an application to operate on behalf of multiple users for a communication session in accordance with embodiments of the present disclosure.

With reference now to FIG. 9, a process of utilizing a CSID to enable an application 208 to operate on behalf of multiple users for a communication session will be described in accordance with embodiments of the present disclosure. As noted above, when a communication session is established, the communication session may be assigned a unique CSID. The CSID may be assigned to the communication session for the duration of the communication session. Upon termination of the communication session, the CSID may be returned to a CSID repository where it can be assigned to another communication session at a later point in time. While the CSID is assigned to a particular communication session, each anchor point server 216 that is involved in the communication session (e.g., by having established one or more anchor points in the application sequence of that communication session) may be notified of the CSID and the CSID used by each anchor point server 216 to refer to the communication session may be the same across all anchor point servers 216.

In some embodiments, it is desirable for an application 208 to refer to the communication session that it wants to control or be bound to rather than referring to a user that is involved in the communication session. Requests which reference a CSID rather than a user are generally desirable in situations where the application 208 is issuing the request for all participants in a call or to add a user to an in-progress call. In these cases, the request is still directed to an anchor point server 216 that has an anchor point and a call model for the communication session corresponding to the CSID as described above. If the request is initially directed to an anchor point server 216 that hasn't established an anchor point in the communication session, then that anchor point server 216 may either query other anchor point servers 216 or refer to its internally-maintained lists 220*a*, 220*b* to discover which anchor point server 216 is authoritative for the requested CSID and will redirect the application 208 to that anchor point server 216. This prevents the anchor point servers 216 from having to share any per-call data on an ongoing basis.

The method of utilizing a CSID rather than a user-based request starts with an application 208 receiving a request from a user to either issue a query for all participants in a call, add the user to an in-progress call, or perform some other function that requires a reference to the communication session itself rather than a reference to a particular user (step 904). In response to receiving the request, the application 208 attempts to determine the CSID that has been assigned to the communication session (step 908). There are generally two ways in which the application 208 can obtain this CSID information: it can be informed of the CSID via a communication event when it is monitoring a user or it can query for all calls that a given user is involved in. The CSID is something that the application 208 is responsible for tracking rather than the client library 212; however, client library 212 and not the application 208 will track the association between a CSID and an anchor point server 216.

The application 208 then provides the client library 212 with the CSID, which causes the client library 212 to attempt to identify an anchor point server 216 that is authoritative for that CSID (step 912). If this information is not known to the client library 212, then the client library 212 may send a request to one of the anchor point servers 216 in hopes that it either is or knows of the anchor point server 216 that is authoritative for the CSID. Alternatively, the client library 212 may identify users that are associated with that CSID by referencing its locally-maintained mappings as this information may be used to identify an anchor point server 216 that is authoritative for the CSID.

The application 208 and client library 212 then work through the process described with respect to FIGS. 7 and/or 8 and the application 208 is eventually bound to the communication session via the appropriate anchor point server(s) 216. Thereafter, the application 208 is capable of exerting control over the communication session on behalf of multiple users involved in the communication session (step 916). In particular, the application 208 may be allowed to leverage an anchor point established by the anchor point server 216 to exert call and media control over the communication session.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
  receiving, at an application, a request to monitor and control communication sessions for a user;
  transmitting, by the application to one or more anchor point servers, a request to receive event information for the user's communication sessions from the one or more anchor point servers;
  determining an identity of a first anchor point server that will establish an anchor point in at least some of the user's communication sessions;
  establishing a communication link between the application and first anchor point server such that the application can receive event information about the user's communication sessions via the communication link;
  allowing the application to control at least some of the user's communication sessions via the first anchor point server;
  wherein the first anchor point server is authoritative for a first user that issued the request received at the application and wherein the identity of the first anchor point is determined by a client library, the client library servicing a plurality of applications; and updating a data entry in the client library to reflect that the first anchor point server is authoritative for the first user.

2. The method of claim 1, wherein the first anchor point server is authoritative for the communication session and maintains exclusive control with respect to other anchor point servers over a Communication Session ID assigned to the communication session.

3. A method, comprising:
receiving, at an application, a request to monitor and control communication sessions for a user;
transmitting, by the application to one or more anchor point servers, a request to receive event information for the user's communication sessions from the anchor point server;
determining an identity of a first anchor point server that will establish an anchor point in at least some of the user's communication sessions;
establishing a communication link between the application and first anchor point server such that the application can receive event information about the user's communication sessions via the communication link;
allowing the application to control at least some of the user's communication sessions via the first anchor point server; and
wherein the first anchor point server receives event information about the communication session from a conference focus and wherein the first anchor point server composes a complete roster list for the conference.

4. The method of claim 3, wherein the conference focus comprises a conference mixer that is mixing three or more media streams from three or more endpoints engaged in the communication session.

5. The method of claim 1, wherein the application is allowed to control all of the user's communication sessions via the first anchor point server as long as the first anchor point server is active.

6. A non-transitory computer readable medium having stored thereon instructions that cause an application server containing the computer readable medium to execute a method, the instructions comprising:
instructions configured to receive and analyze a request to exert call and/or media control over a communication session for a first user;
instructions configured to transmit, to one or more anchor point servers, a request to receive event information about the communication session from the one or more anchor point servers;
instructions configured to determine an identity of a first anchor point server that has already established or will establish an anchor point in the communication session for the first user;
instructions configured to establish a communication link with the first anchor point server such that the application server can at least one of transmit control signals for the communication session via the communication link and receive event information about communication session via the communication link; and wherein the first anchor point server is authoritative for the first user; and wherein the instructions further comprise instructions configured to update a client library maintained at the application server to reflect that the first anchor point server is authoritative for the first user.

7. The non-transitory computer readable medium of claim 6, wherein the client library is shared by a plurality of applications and maintains a local data structure which maps users to authoritative anchor point servers.

8. The non-transitory computer readable medium of claim 6, wherein the first anchor point server is authoritative for the communication session and maintains exclusive control with respect to other anchor point servers over a Communication Session ID assigned to the communication session.

9. The non-transitory computer readable medium of claim 6, wherein the communication session is already established when the request is transmitted.

10. The non-transitory computer readable medium of claim 6, wherein the communication session is not already established when the request is transmitted.

11. A communication system, comprising:
a first anchor point server configured to establish at least a first anchor point in one or more communication sessions;
a second anchor point server configured to establish at least a second anchor point in one or more communication sessions;
an application executed on an application server, the application configured to utilize one or both of the first and second anchor point servers to exert at least one of call and media control over a communication session;
wherein the first anchor point server is authoritative for a first user that issued a request received at the application and wherein the identity of the first anchor point is determined by a client library, the client library servicing a plurality of applications; and
updating a data entry in the client library to reflect that the first anchor point server is authoritative for the first user.

12. The system of claim 11, wherein the second anchor point server is authoritative for a second user.

13. The system of claim 12, wherein a mapping of the first anchor point server to the first user and a mapping of the second anchor point server to the second user is maintained in the client library.

14. The system of claim 11, wherein the communication session is an in-progress communication session and wherein one or both of the first and second anchor point servers are utilized by the application to exert at least one of call and media control over the in-progress communication session when the application was not initially sequenced into an application sequence during initialization of the communication session.

15. The system of claim 11, wherein the application is initially bound to the communication session when at least one of the first and second anchor point servers are sequenced into the communication session.

* * * * *